(12) United States Patent
Brown et al.

(10) Patent No.: US 7,318,895 B2
(45) Date of Patent: Jan. 15, 2008

(54) BIODESTRUCTION OF BLENDED RESIDUAL OXIDANTS

(75) Inventors: Jess C. Brown, Sarasota, FL (US); Brandon C. Heidelberger, Sandy, UT (US); Rick D. Wheadon, Alpine, UT (US); Edwin J. Hansen, Jr., Magna, UT (US)

(73) Assignee: Carollo Engineers, PC, Fountain Valley, CA (US)

( * ) Notice: Subject to any disclaimer, the term of this patent is extended or adjusted under 35 U.S.C. 154(b) by 0 days.

(21) Appl. No.: 11/546,661

(22) Filed: Oct. 11, 2006

(65) Prior Publication Data

US 2007/0034566 A1 Feb. 15, 2007

Related U.S. Application Data

(63) Continuation-in-part of application No. 11/239,797, filed on Sep. 28, 2005, now abandoned, which is a continuation-in-part of application No. 11/070,923, filed on Mar. 3, 2005, now abandoned.

(51) Int. Cl.
*C02F 3/00* (2006.01)

(52) U.S. Cl. .................. 210/607; 210/616; 210/617; 210/620; 210/621; 210/622

(58) Field of Classification Search .............. 210/607, 210/616–617, 620–622
See application file for complete search history.

(56) References Cited

U.S. PATENT DOCUMENTS 3,964,998 A * 6/1976 Barnard .................. 210/605
2006/0201876 A1 * 9/2006 Jordan .................... 210/609

OTHER PUBLICATIONS

"Drinking Water with Emphasis on Perchlorate Treatment," Carollo Engineers (date unknown) (downloaded from www.carollo.com on Feb. 25, 2007).*

* cited by examiner

*Primary Examiner*—Chester T. Barry
(74) *Attorney, Agent, or Firm*—Dennis W. Beech

(57) ABSTRACT

The present invention may be used for treatment of waste streams using domestic wastewater. A concentrate waste stream containing one or more of perchlorate, nitrate, bromate, selenate and chromate may be combined with a domestic wastewater stream. The concentrate waste stream may have not less than 3000 mg/l of total dissolved solids. The concentrate waste stream and domestic wastewater stream may be combined at a ratio of between 20% volumetric flow rate and 75% volumetric flow rate to produce a blended stream. The blended stream may be processed in a bioreactor.

14 Claims, 2 Drawing Sheets

BIODESTRUCTION OF BLENDED RESIDUAL OXIDANTS

This is a continuation-in-part application of U.S. patent application Ser. No. 11/239,797 filed on Sep. 28, 2005 which application is a continuation-in-part application of U.S. patent application Ser. No. 11/070,923 filed on Mar. 3, 2005, now abandoned. U.S. patent application Ser. No. 11/239,797 is now abandoned.

BACKGROUND OF THE INVENTION

This invention relates to processes for treatment of concentrated oxidant waste streams. The new method may combine a wastewater stream with an oxidant-laden stream to produce a blended stream that may be treated in a bioreactor.

Existing processes used to biologically treat concentrated oxidant streams may typically require a dedicated deoxygenating step, require long residence times due to high solution salinities, require the addition of an exogenous substrate such as ethanol, or require inoculation with exogenous salt tolerant bacteria. As an example, nitrate and perchlorate may be removed in a drinking water treatment process. If a brine line discharge may not exist or be permitted, the waste streams may often be treated using a dedicated brine bioreactor designed to degrade nitrate and perchlorate in a waste stream. There may be several problems associated with biologically treating saline waste streams. Microbial cultures may be very sensitive to slight changes in ionic strength, that is, total dissolved solids. Increased salinity may tend to disrupt normal metabolic function and thereby reduce degradation kinetics. Treating saline wastewaters can increase the concentration of effluent solids. Acclimating effective salt tolerant cultures using traditional microbial sources, for example, sludge from a municipal wastewater treatment plant, may be difficult.

Other considerations for dedicated brine bioreactors may be that the waste stream must be anoxic/anaerobic to achieve biological oxidant reduction. Also, an exogenous electron donor such as acetic acid or ethanol must be added to the system to serve as a substrate, an electron donor.

SUMMARY OF THE INVENTION

The present invention is directed to methods and processes for treatment of waste streams using domestic wastewater. A concentrate waste stream containing one or more of perchlorate, nitrate, bromate, selenate and chromate may be combined with a domestic wastewater stream. The concentrate waste stream may have not less than 3000 mg/l of total dissolved solids. The concentrate waste stream and domestic wastewater stream may be combined at a ratio of between 20% volumetric flow rate and 75% volumetric flow rate to produce a blended stream. The blended stream may be processed in a bioreactor.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
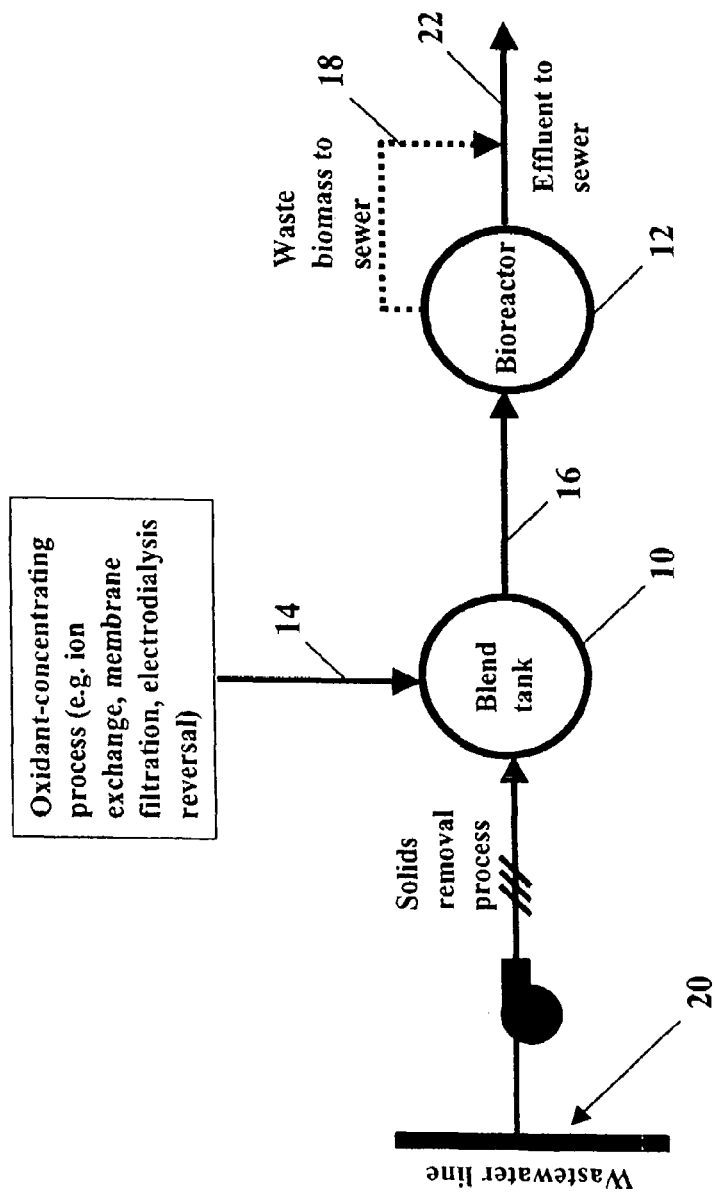
FIG. 1 illustrates a flow diagram of the process according to an embodiment of the invention.
Figure 2:
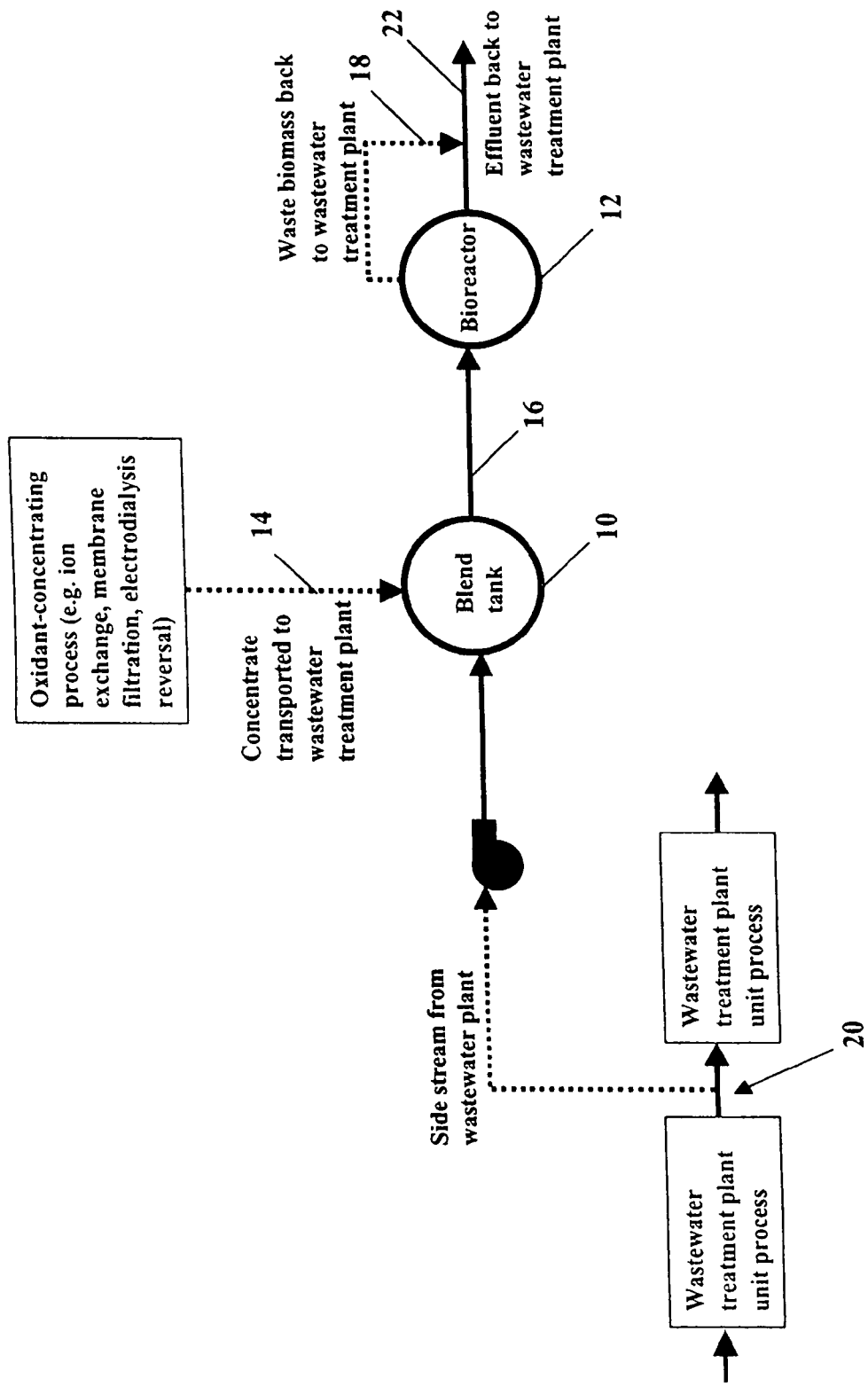
FIG. 2 illustrates a flow diagram of the process according to an embodiment of the invention.

Referring to FIGS. 1 and 2, a method for treatment of concentrate waste streams containing nitrate, perchlorate, bromate, selenate, chromate and the like, may combine a processed, for example, screened or clarified domestic wastewater stream 20 with a concentrate waste stream 14 to produce a blended stream. The blended stream 16 may be treated in a bioreactor 12 that reduces the oxidants to innocuous by-products. The bioreactor 12 may be a suspended growth reactor, a granular media fixed film reactor, a membrane based fixed film reactor or the like. The bioreactor effluent 22 and waste biomass 18 may be discharged to a sewer or other collection system.

The use of a domestic wastewater stream 20 may decrease the bulk dissolved oxygen concentration. This may decrease the contact time required to achieve biological oxidant reduction since dissolved oxygen may competitively inhibit biological nitrate, perchlorate, bromate and the like reduction. Blending the concentrated waste stream 14 with domestic wastewater 20 may typically decrease the salinity and thereby may improve biodegradation kinetics. The background organics present in domestic wastewater 20 may serve as the substrate for biological oxidant reduction such that no exogenous substrate may need to be added to the system, which may reduce costs and concerns associated with chemical amendments. The bioreactor 12 may be acclimated with organisms indigenous to the local domestic wastewater thereby eliminating the need for an exogenous microbial enrichment or seed. Domestic wastewater as may be understood in the art is discharge from residences and from commercial, institutional, and similar facilities.

The domestic wastewater should contain organics that may serve as an electron donor to reduce oxidants present in the concentrate waste stream 14. The domestic wastewater stream 20 may contain lower concentrations of dissolved oxygen than the concentrate waste stream such that the dissolved oxygen concentration in the blended stream may be lower than the dissolved oxygen concentration in the concentrate waste stream. The domestic wastewater stream 20 may also contain lower concentrations of total dissolved solids, that is, salinity, than the concentrate waste stream such that the total dissolved solids concentration in the blended stream may be lower than the total dissolved solids concentration in the concentrate waste stream. The concentrate waste stream 14 may have a total dissolved solids of not less than 3000 mg/l and may be treated with a domestic wastewater stream 20 that may typically have total dissolved solids of 850 mg/l or less. Experiments have shown that for a concentrate waste stream 14 having total dissolved solids of not less than 6000 mg/l treatment with domestic wastewater provides good blended results. The concentrate waste stream 14 may contain less than 4 mg/l of dissolved oxygen. The domestic wastewater stream 20 may contain oxidant-reducing bacteria suitable for seeding the bioreactor for perchlorate, nitrate, bromate, selenate and chromate treatment.

The treatment process or method may combine screened or clarified domestic wastewater 20 scalped from a local domestic wastewater system with a concentrated waste stream 14 at the site where the concentrate waste stream 14 may be generated, for example, a drinking water treatment plant, a chemical plant such as for solid rocket fuel manufacturing, or the like, and then treat the blended stream 16 in a dedicated bioreactor 12. The concentrated waste stream 14 may be collected and transported to a municipal domestic wastewater treatment facility where it may be combined with a side stream of screened or clarified domestic wastewater and treated in a dedicated bioreactor 12.

Blending of the concentrate waste stream 14 and screened or clarified domestic wastewater stream may occur at a wide range of ratios that may be site specific. Ambient domestic wastewater quality may be used as a wide range of acceptable water quality may be anticipated.

The concentrate waste stream 14 may be combined with a domestic wastewater stream at a ratio of 20% to 75% to produce a blended stream 16. The combining ratio relationship is defined as the volumetric flow rate of the concentrate waste stream at in-use pressure related to the concentrate waste stream producing facility and the chosen domestic wastewater stream source where the pressure may be atmospheric or other value divided by the sum of the volumetric flow rate of the concentrated waste stream and the flow rate of the domestic wastewater stream. The blended stream 16 may contain lower concentrations of dissolved oxygen and total dissolved solids, and a higher concentration of biodegradable organic matter than the concentrate waste stream 14.

Of the bioreactors 12 available, the fixed film bioreactor for perchlorate-reducing metabolic activity may be more stable than that of suspended cultures. Research may have shown that when suspended perchlorate-reducing bacteria are exposed to dissolved oxygen their perchlorate reducing metabolic activity may recover slowly when anaerobic conditions are reestablished. Perchlorate degradation kinetics in fixed film processes may not be significantly impacted by transient dissolved oxygen exposure. A gradient of redox potential may develop across the depth of a reactor bed. This may allow for the development of semidistinct dissolved oxygen, nitrate and perchlorate reducing zones in the bed that may force bacteria to utilize a specific metabolic activity instead of continuously altering metabolic states. A redox potential gradient may be established across the depth of a given biofilm that may permit perchlorate reduction even if the bulk solution may not be fully anaerobic.

Experiments have shown that destruction of perchlorate concentrates to below detection may be achieved through domestic wastewater blending and treatment in a fixed bed bioreactor. The results show that no amendments may be necessary other than domestic wastewater and that required empty bed contact times may be between 3 minutes and 180 minutes. The blended stream 16 may have a pH between 5 and 10; although, higher or lower pH levels may be used, it has been found that additional chemical components may need to be added for treatment of the blended stream. Such chemical treatment may make the process less efficient, particularly concerning the overall cost of the process. The temperature of the blended stream may be maintained between 5 and 40 degrees Celsius. The empty bed contact time may vary between approximately 3 and 180 minutes.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for treatment of concentrate waste streams using domestic wastewater comprising:
    combining a concentrate waste stream containing at least one of perchlorate, nitrate, bromate, selenate and chromate, and containing not less than 3000 mg/l of total dissolved solids, with a domestic wastewater stream at a ratio of between 20% volumetric flow rate and 75% volumetric flow rate to produce a blended stream;
    said ratio for combining is the flow rate of said concentrate waste stream divided by the sum of the flow rate of said concentrate waste stream and the flow rate of said domestic wastewater stream; and
    processing said blended stream in a bioreactor.

2. The method as in claim 1 wherein said blended stream has lower concentrations of dissolved oxygen and total dissolved solids, and a higher concentration of a biodegradable organic matter than said concentrate waste stream.

3. The method as in claim 1 wherein said blended stream has a pH between approximately 5 and 10.

4. The method as in claim 1 wherein the temperature of said blended stream is between approximately 5 degrees and 40 degrees Celsius.

5. The method as in claim 1 wherein the contact time in said bioreactor is between approximately 3 minutes and 180 minutes.

6. The method as in claim 1 wherein said domestic wastewater stream is a portion of a wastewater stream source at a wastewater treatment facility.

7. The method as in claim 1 wherein said domestic wastewater stream is a portion of a wastewater stream source channeled to a concentrate waste stream source site.

8. The method as in claim 1 wherein said domestic wastewater stream is processed for the removal of suspended solids prior to being combined with said concentrate waste stream.

9. The method as in claim 1 wherein said bioreactor is selected from the group consisting of a suspended growth reactor and a fixed film reactor.

10. The method as in claim 1 wherein said concentrate waste stream contains not less than 4 mg/l of dissolved oxygen.

11. The method as in claim 1 wherein said domestic wastewater stream has an organic content that serves as an electron donor source to reduce the oxidants present in said concentrate waste stream.

12. The method as in claims 11 wherein said domestic wastewater stream has a lower concentration of dissolved oxygen than said concentrate waste stream.

13. The methods as in claim 11 wherein said domestic wastewater stream has a lower concentration of total dissolved solids than said concentrate waste stream.

14. The method as in claim 11 wherein said domestic wastewater stream contains oxidant-reducing bacteria suitable for seeding said bioreactor for perchlorate, nitrate, bromate, selenate and chromate treatment.

* * * * *